United States Patent [19]

Diaz Nogueira et al.

[11] 4,235,713
[45] Nov. 25, 1980

[54] PROCESS FOR THE ELIMINATION OF ACCUMULATED IRON IN ORGANIC PHASES OF FLUID-FLUID EXTRACTION THAT CONTAIN DI-2-ETHYL-HEXYL PHOSPHORIC ACID

[76] Inventors: Eduardo Diaz Nogueira, Avda. Mediterraneo 47; Angel L. Redondo Abad, Gabriel Ruiz 7; Jose M. Regife Vega, San Ernesto 12, all of Madrid, Spain

[21] Appl. No.: 913,092

[22] Filed: Jun. 6, 1978

Related U.S. Application Data

[63] Continuation of Ser. No. 734,820, Oct. 22, 1976, abandoned.

[51] Int. Cl.² .......................................... B01D 11/04
[52] U.S. Cl. .................................... 210/638; 210/688
[58] Field of Search .................. 210/21, 22 R, 24, 32, 210/34, 37 B, 38 B, 59, 60; 260/545 P, 920; 252/301.1 U; 423/10

[56] References Cited

U.S. PATENT DOCUMENTS

| | | | |
|---|---|---|---|
| 3,082,062 | 3/1963 | Preuss | 210/21 |
| 3,574,532 | 4/1971 | Schulz et al. | 423/10 |

Primary Examiner—Ivars C. Cintins
Attorney, Agent, or Firm—Robert L. Lindgren; Lloyd L. Zickert

[57] ABSTRACT

The present invention refers to a process for the elimination of accumulated iron in organic phases of fluid-fluid extraction that contain di-2-ethyl-hexyl phosphoric acid, by means of its treatment by direct contact with an acid aqueous solution of chloride ions, which is subsequently subjected to the action of an anionic ion exchanger that extracts the iron and leaves it iron-free for its re-utilization, and the regeneration of the anionic exchanger by means of treating it with water, purifying the iron from the system in the form of a relatively concentrated ferric chloride aqueous solution.

9 Claims, 1 Drawing Figure

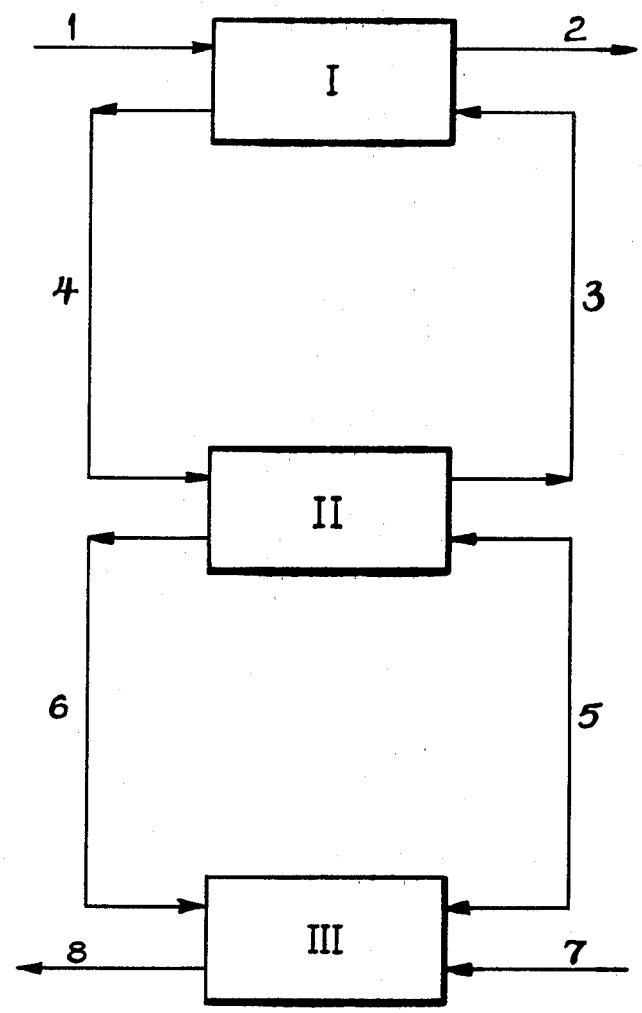

PROCESS FOR THE ELIMINATION OF ACCUMULATED IRON IN ORGANIC PHASES OF FLUID-FLUID EXTRACTION THAT CONTAIN DI-2-ETHYL-HEXYL PHOSPHORIC ACID

This is a continuation of application Ser. No. 734,820 filed Oct. 22, 1976, now abandoned.

Di-2-ethyl-hexyl phosphoric acid is used commercially as a cationic exchanger in the extraction of hexavalent uranium from sulfate solutions, in the separation of uranium and vanadium, in the separation and purification of rare earths, in the separation of cobalt and nickel, in the extraction of beryllium from sulfate solutions, in the separation of zinc, iron, maganese and cobalt, in the extraction of zinc, and in many other applications that are in the course of development.

In all these processes the fluids processed as aqueous feed usually contain various ionic impurities, one of the most common being iron. The affinity of di-2-ethyl-hexyl phosphoric acid for iron is so high that even in very low concentrations it is extracted quantitatively forming a complex that polymerizes in the organic phase, reaching molecular polymerization weights of the order of 2,000. This phenomenon, in time, produces a marked decrease of the load capacity of the cationic exchanger as well as a considerable increase in viscosity in the organic phase that makes difficult and even prevents its utilization as an extraction agent in a very large number of possible applications.

It is well known that there are two possible processes to eliminate iron from these organic phases.

The first consists in washing it with a strong alkaline solution of hydroxide or sodium carbonate. This treatment achieves the rupture of the polymer forming ferric hydroxide the sodium salt of di-2-ethyl-hexyl phosphoric acid. The presence of the precipitate of ferric hydroxide in the aqueous stage and the high degree of disassociation of the sodium salt from the acid causes the carrying along and the solubility of the di-2-ethyl-hexyl phosphoric acid to be so high that they make its application on an industrial scale prohibitive economically speaking.

The second process consists in washing it with an aqueous solution of 6 M hydrochloric acid. This treatment also achieves the rupture of the polymer by the formation of the anionic complex from the ferric ion in a chloride medium, $CL_4Fe^-$, that displaces the cationic exchange between the $F^{+++}$ ions of the organic stage and the $H^+$ ions of the aqueous stage. This process is not very attractive from the economic point of view because of the high consumption of acid necessary.

In this second process the consumption of hydrochloric acid is determined by the balance existing between the two phases during the treatment with respect to the ferric ion, which makes it necessary to purify the acid aqueous solution when a given concentration of iron is reached but which always represents an insignificant fraction of the acid equivalents utilized so that the consumption of acid normally represents from 10 to 20 times the stochiometry of the iron.

DESCRIPTION OF THE DRAWING

The objects and advantages of the present invention will become more fully apparent from the following description when read in conjunction with the accompanying drawing and wherein:

the FIGURE is a flow diagram of a process according to the present invention;

The subject of the present invention is a process for the elimination of iron accumulated in the organic stages that contain di-2-ethyl-hexyl phosphoric acid by means of an acid aqueous solution containing chloride ions and the subsequent treatment of the regeneration liquid in order, by means of the elimination of the iron, to reuse it.

The process that is the subject of the present invention therefore consists of three stages:

In the first stage the organic phase containing di-2-ethyl-hexyl phosphoric acid "poisoned" by iron is placed in contact with an acid solution containing chloride ions in concentrations such as produce the exchange of $H^+$ ions for $Fe^{+++}$ ions between the aqueous phase and the organic phase, achieving the "regeneration" of the organic phase.

The second stage consists of the extraction of the iron contained in the regeneration fluid of the preceding stage by means of its contact with an organic solution containing an anionic ion exchanger in such a way that the regeneration liquid is reutilized in the first stage after the replacement of the stochiometric hydrochloric acid equivalent to the iron eliminated.

The third stage consists of the re-extraction of the iron from the organic phase containing the anionic exchanger proceeding from the preceding stage by means of its contact with water, so that this organic stage, free from iron, is recycled for reutilization in the second stage.

In brief, the iron passes from the organic phase containing the di-2-ethyl-hexyl phosphoric acid to the water by means of two intermediate vehicles: an acid solution of chloride ions and an organic solution of an anionic exchanger, the whole of the process which is the subject of this invention producing only the consumption of hydrochloric acid equivalent to the iron eliminated and the quantity of water necessary to evacuate from the system the ferric ions eliminated.

In the first stage, or the regeneration stage, the reaction mechanism is one of cationic exchange and in a simplified form it may be represented by the following equilibrium:

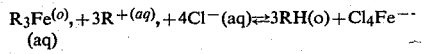

$$R_3Fe^{(o)} + 3R^{+(aq)} + 4Cl^-(aq) \rightleftarrows 3RH(o) + Cl_4Fe^{--}(aq)$$

RH being the di-2-ethyl-hexyl phosphoric acid. Thus, in principle, the regeneration reagent may be any mixture of an inorganic mineral acid and a soluble chloride, hydrochloric acid being preferable from the practical point of view, alone or mixed with sodium chloride or calcium chloride, and sulfuric acid with sodium chloride.

The optimum concentrations of these reagents in the regenerating liquid obviously depend on the concentration of di-2-ethyl-hexyl phosphoric acid in the organic phase and on the level of residual iron that is sought in the application in question.

For a concentration that is widely utilized of 10% v/v in kerosene, the optimum environment of concentration of hydrochloric acid in the regenerating liquid is found between 4 and 6 molar.

The regeneration of the di-2-ethyl-hexyl phosphoric acid may be carried out in any extraction equipment with solvents and preferably in sedimentator-mixers.

This type of apparatus is that which was used in our tests continuously.

The time required for agitation or contact in order to attain the equilibrium depends on the concentrations in the organic and aqueous phases and on the degree of agitation. In any case it was less than 10 minutes, values of less than 3 minutes predominating.

The separation of phases does not offer any difficulty.

In a single contact between the regenerating reagent in the form of hydrochloric acid 5.5 M and the organic phase with di-2-ethyl-hexyl phosphoric acid 10% v/v, with appropriate regulation of the ratio of the flows of both, the eliminations of the latter was achieved plus 90% of the iron, an organic phase resulting that contains iron in quantities of less than 150 mg/l.

The temperature compatible with the process varies between 10° and 50° C.

The concentrations of D2EHPA in the organic phase may vary between 1% and 50% v/v.

The concentrations of chloride ion in the regenerating reagent may vary from 0.1 to 12 M, the best results being obtained in the environment of 4.0 to 6.0 M.

Another aim of the process of the present invention is the elimination of iron from the aqueous reagent used in the regeneration of the di-2-ethyl-hexyl phosphoric acid for the purpose of utilizing it again.

In order to extract the iron in the second cycle, an organic phase is employed constituted by three components: an extraction agent, a modifier and a diluting agent.

The extraction agent belongs to the amino groups, and may be primary, secondary, or tertiary, or on a basis of quaternary ammonium with long alkylic chains, only slightly soluble in water and with a molecular weight superior to 200.

The second component of the organic phase—modifier—has the purpose of facilitating the separation of phases during extraction. Alcohols of from 8 to 14 carbons give the desired results.

The third component or the diluting agent serves as the carrier of the other two reagents and causes the viscosity of the medium to decrease. A hydrocarbon may be used or mixtures of hydrocarbons such as those obtained in the fractionating process in the distillation of petroleum.

The fixing of the iron on the extraction agent is based on the fact that this element forms in solutions of chloride ion the chlorinized complex of an anionic nature, $Cl_4Fe^-$, in accordance with the equilibrium:

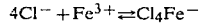

The extraction of the iron is carried out by an ionic exchange mechanism, between the chloride of the aminated compound and the ion complex of the iron. For the case of secondary amine chloride, $(R_2H_2NCl)$, the equilibrium may be represented by the following equation:

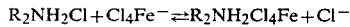

The displacement of this reaction towards the right—the direction of extraction—to the extent that it is made by the concentrations of $Fe^{3+}$ and $Cl^-$, on all the latter, which intervenes in the constant of formation of the anionic complex of the iron.

The extraction of iron may be carried out in any extraction equipment with solvents, preferably in sedimentator-mixers.

This type of apparatus is that which has been used continuously in our tests.

The time required for agitation or contact in order to attain equilibrium depends on the concentrations in the—organic and aqueous phases and on the degree of agitation. In any case it was less than 10 minutes, values of from—between 2 and 5 minutes being predominant.

When there is a modifier in the organic phase the separation of phases does not present any difficulty.

In a single contact between the organic phase containing the amine and the regerating reagent, appropriately regulating the ratio of the flow of both, an elimination was achieved of more than 95% of the iron from the latter, an aqueous extract resulted with a concentration of iron inferior to 40 mg/l.

The temperature compatible with the process varies between 10° and 50° C.

The concentrations of amine in the organic phase may vary between 1 and 50%, and the concentration of aliphatic alcohol from 0 to 25% depending on the concentration of iron and chlorides in the regenerating reagent.

The re-extraction of iron from the organic phase that contains the amine is carried out with water, being based on the disassociation of the anionic complex of iron $Cl_4Fe^-$ in the absence of chloride ions. Depending on the ratios of the flows of the organic phase and water, more or less concentrated solutions of ferric chloride may be obtained as well as a greater or less discharge of the organic phase.

After re-extraction, the organic phase is practically free of iron, so that it is re-utilized in the process.

Losses of regenerating reagent (hydrochloric acid) using this method are reduced to the stochiometric consumption corresponding to the iron plus the small amount of purifying necessary to maintain the balance of water in the system.

This method may also be used for regenerating the di-2-ethyl-hexyl phosphoric acid of other ions that form anionic complexes in chloride environments such as: chrome, aluminium, etc.

The invention is illustrated by means of a number of examples that are not limitative, and in order to facilitate the interpretation a drawing is also attached.

EXAMPLE NO. 1

An illustrative example is given below, which is not limitative, of the regeneration of the D2EHPA. An organic phase is established whose composition is the following:

D2EHPA: 10% v/v
Petroleum (CAMPSA): 90% v/v

This organic phase is charged with iron to a concentration of 0.338 g/l. In what follows the above-mentioned organic phase is subjected to a contact, in a single stage, with a solution of hydrochloric acid 5.9 M. The ratio of the flows in the organic phase to those of aqueous phase was 10.

The results were the following:
Iron in the organic phase: 0.110 g/l
Iron in the aqueous phase: 2.19 g/l

EXAMPLE NO. 2

A new demonstrative and non limitative example is given in what follows in which all the concentrations of the regenerating reagent that have been enumerated may be used to regenerate the D2EHPA.

The organic phase has a composition the same as that utilized in example No. 1.

The concentrations of iron in the organic phase, the concentrations of regenerating reagent and the ratio of the flows in the organic phase to those of aqueous phase are the following:

| Test | Organic phase gFe/l | Regenerating solution ClH M/l | Ratio of flows organic/aqueous |
|---|---|---|---|
| 1 | 0.240 | 5.0 | 30 |
| 2 | 0.240 | 5.0 | 20 |
| 3 | 0.338 | 5.0 | 10 |
| 4 | 0.338 | 5.0 | 5 |
| 5 | 0.240 | 4.0 | 5 |
| 6 | 0.338 | 3.9 | 5 |
| 7 | 0.338 | 3.0 | 10 |

Both phases were subjected to a contact in a single stage, the following results being produced:

| Test | Organic resultant gFe/l | Aqueous resultant gFe/l |
|---|---|---|
| 1 | 0.110 | 3.57 |
| 2 | 0.090 | 2.60 |
| 3 | 0.055 | 2.45 |
| 4 | 0.068 | 1.37 |
| 5 | 0.120 | 2.23 |
| 6 | 0.063 | 1.34 |
| 7 | 0.190 | 1.48 |

EXAMPLE NO. 3

Another demonstrative and non-limitative example is given below in which all the compositions of the regenerating reagent enumerated may be used in order to regenerate the D2EHPA.

The organic phase has a composition the same as that utilized in the preceding examples.

The concentrations of iron in the organic phase, the composition of the regenerating solution and the ratio of flows in the organic phase to those of the aqueous phase are the following:

| Test | Organic phase gFe/l | Regenerant solution K/l ClH | ClMa | SO$_4$H$_2$ | Ratio of flows Organic/aqueous |
|---|---|---|---|---|---|
| 1 | 0.338 | 5.0 | 1.0 | — | 10 |
| 2 | 0.338 | 4.0 | 1.1 | — | 15 |
| 3 | 0.240 | 4.0 | 1.1 | — | 20 |
| 4 | 0.338 | 2.9 | 2.2 | — | 10 |
| 5 | 0.338 | 2.0 | 3.3 | — | 10 |
| 6 | 0.338 | 2.0 | 2.0 | 2.0 | 10 |

Both phases were subjected to a contact in a single stage, the following results being produced:

| Test | Organic resultant gFe/l | Aqueous resultant gFe/l |
|---|---|---|
| 1 | 0.098 | 2.34 |
| 2 | 0.115 | 3.40 |
| 3 | 0.095 | 2.70 |
| 4 | 0.115 | 2.24 |
| 5 | 0.165 | 2.69 |
| 6 | 0.123 | 2.13 |

EXAMPLE NO. 4

A non-limitative illustrative example is given below of the elimination of iron from the liquid for regenerating D2EHPA. The composition of the organic phase is the following:

| | |
|---|---|
| Amberlite-LA-2 (commercial secondary amine) | 15% |
| Isodecanol | 6% |
| Petroleum (CAMPSA) | 79% |

The above-mentioned organic phase was then subjected to a contact, in a single stage, with the regeneration effluent from the D2EHPA. The organic stage charged with iron was re-extracted with water in one stage.

The concentrations of iron in the effluent from the regeneration and the ratio of flows in the organic phase to those in the aqueous phase in extraction and re-extraction are the following:

| Test | Regenerant solution gFe/l | Ratio of flows extraction organic/aqueous | Ratio of flows re-extraction organic/aqueous |
|---|---|---|---|
| 1 | 3.24 | 1.80 | 7.20 |
| 2 | 3.04 | 0.67 | 3.23 |
| 3 | 3.20 | 1.25 | 5.59 |
| 4 | 3.48 | 2.54 | 10.06 |
| 5 | 2.69 | 1.98 | 10.23 |
| 6 | 2.97 | 2.50 | 17.12 |

The results were the following:

| Test | Aqueous extract. gFe/l | Organic extract. gFe/l | Aqueous re-extract. gFe/l | Organic re-extr. gFe/l |
|---|---|---|---|---|
| 1 | 0.20 | 1.81 | 12.20 | 0.12 |
| 2 | 0.63 | 3.77 | 11.60 | 0.18 |
| 3 | 0.43 | 2.79 | 12.40 | 0.58 |
| 4 | 0.20 | 1.47 | 13.00 | 0.18 |
| 5 | 0.08 | 2.54 | 13.50 | 1.22 |
| 6 | 0.27 | 2.53 | 18.50 | 1.45 |

EXAMPLE NO. 5

This example sums up the results of the regeneration of D2EHPA and of the elimination of iron from the effluent from regeneration, carried out continuously on the scale of a pilot study. The stages of the process are identified with Roman numerals and the main flows are identified in the FIGURE with arabic numerals.

In these tests the process consists of the following stages:

| | |
|---|---|
| Regeneration of D2EMPA | I |
| Extraction with LA-2 | II |
| Re-extraction with water | III |

An organic extract was available proceeding from a previous extraction stage. The organic extract had the following composition:

| | | |
|---|---|---|
| Iron | 0.29 g/l | |
| Zinc | 0.26 g/l | |
| ClH Acids | 0.5 g/l | |

The regeneration reagent utilized was a solution of hydrochloric acid with a concentration of 4.9 M/l.

A summary is given below of the flows and compositions of the main flows of the process, which flows are detailed on the sheet of drawings attached to this memorandum.

| No. Flow Figure | Identification | Flow ml/min | Composition in g/l Fe | Zn | ClH |
|---|---|---|---|---|---|
| 1 | Organic feed (D2EMPA) | 1119 | 0.29 | 0.26 | 0.5 |
| 2 | Organic extract | 1119 | 0.08 | 0.013 | 0.5 |
| 3 | Regenerant solution | 114 | 0.014 | 1.70 | 161.0 |
| 4 | Regeneration effluent | 114 | 2.00 | 3.40 | 161.0 |
| 5 | Re-extracted organic phase (LA-2) | 224 | 0.040 | 1.20 | — |
| 6 | Charged organic phase | 224 | 1.10 | 2.20 | — |
| 7 | Re-extraction water | 46 | — | — | — |
| 8 | Aqueous extract | 46 | 5.50 | 4.20 | 4.00 |

What is claimed is:

1. A process for the removal of accumulated iron from organic solutions of liquid-liquid solvent extraction systems that contain di-2-ethyl-hexyl phosphoric acid which comprises contacting a first organic solution containing the di-2-ethyl-hexyl phosphoric acid and the accumulated iron with an aqueous acid solution containing chloride irons to effect the removal of iron from the first organic solution and to obtain an aqueous acid solution containing the iron removed from the first organic solution, contacting the iron containing aqueous acid solution with a second organic solution containing a liquid aminated anionic ion exchanger to extract and effect the removal of the iron from the aqueous acid solution, recovering the iron free aqueous acid solution for reuse in the removal of iron from the first organic solution and then contacting the second organic solution with water to extract iron therefrom and to effect the removal of the iron as an aqueous solution of ferric chloride.

2. The process of claim 1 wherein the aqueous acid solution containing chloride ions is comprised of a mixture of hydrochloric acid, sulphuric acid and a water soluble chloride salt.

3. The process of claim 1 wherein the concentration of chloride ion in the aqueous acid solution is in the range of from 4 to 6 moles per liter.

4. The process of claim 1 wherein the combined concentration of hydrochloric acid and sulphuric acid in the aqueous acid solution is in the range of from 2 to 6 equivalents per liter.

5. The process of claim 1 wherein the liquid anion exchanger is selected from the group consisting of primary, secondary and tertiary aliphatic amine compounds and quaternary ammonium compounds having long alkylic carbon chains, and a molecular weight greater than 200.

6. The process of claim 5 wherein the concentration of amine compounds used as liquid anion exchangers in the second organic solution ranges from 5 to 50% by volume.

7. The process of claim 1 wherein an aliphatic alcohol containing from 8 to 14 carbon atoms in its alkylic carbon chain is incorporated in the second organic solution.

8. The process of claim 7 wherein the concentration of alcohol in the second organic solution ranges from 2 to 25% by volume.

9. The process of claim 1 wherein the second organic solution is a water-immiscible hydrocarbon solvent containing the liquid anion exchanger and the long-chain aliphatic alcohol.

* * * * *